Figure 2:
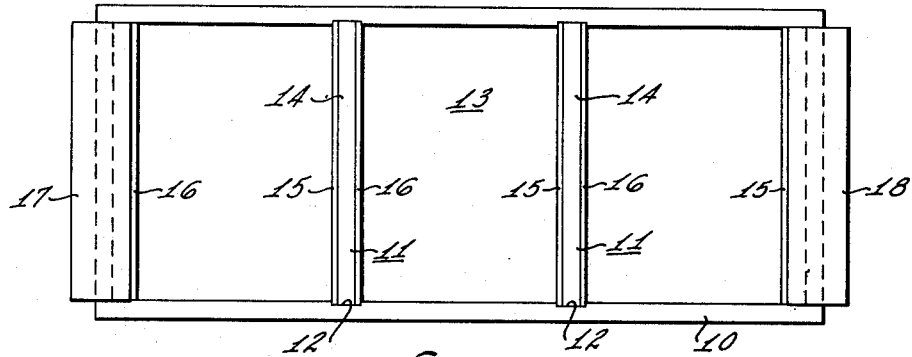

Dec. 29, 1964

P. G. GRIMES ETAL 3,163,560

NONTOXIC LIQUID FUEL CELL

Filed March 20, 1961

Inventors
Patrick G. Grimes
Joachim G. Seibold
by Richard R. Mybeck
Attorney

3,163,560
NONTOXIC LIQUID FUEL CELL
Patrick G. Grimes and Joachim G. Seibold, Milwaukee, Wis., assignors to Allis-Chalmers Manufacturing Company, Milwaukee, Wis.
Filed Mar. 20, 1961, Ser. No. 96,848
7 Claims. (Cl. 136—86)

This invention relates to new and useful improvements in the provision of a power unit to demonstrate the direct production of electrical energy from liquid fuels and more particularly to an improved three component liquid bath for use in low temperature, catalyst activated liquid fuel cells which will permit handling and operation by lay people such as students and the like, and which will not, if spilled or consumed, cause personal injury.

The remarkable renewal of interest in fuel cells in recent months has created a great deal of interest in the mechanics and operation of fuel cells in classrooms throughout the land. Unfortunately, there is a great paucity of material from which today's student may acquire a real understanding and feel for the subject of fuel cells. Consequently, a need exists for a simple, easy to operate unit for demonstrating fuel cell principles which the student may assemble and operate and with which he may experiment. The fulfillment of this need is imperative if the scientific training of our youngsters is to remain current and competitive in a world recently orienting itself toward scientific advancement.

One consideration believed desirable for classroom presentation was that the physical structure of the cell should be simple and the amount of apparatus required should be minimal. Consequently attention was directed to those fuel cells which utilize liquid fuels so that gaseous fuel producing and controlling apparatus could be avoided. Such cells are presently known. For example, a fuel cell which produces electrical energy from the reaction of a liquid fuel and a gaseous oxidant in a liquid electrolyte is disclosed in U.S. 2,925,454, Justi et al., February 16, 1960.

The Justi et al. cell did not fully satisfy our requirements because it exposed the youngsters to certain hazards, hereinafter described and required a gaseous oxidant. Apparatus necessary for controlling a gaseous reagent was still needed.

Next we considered the fuel cell which produces electrical energy from the reaction of a liquid fuel with a liquid oxidant in a liquid electrolyte and is described in the copending application of Adam et al., Serial No. 85,112, filed January 26, 1961.

This cell, while completely eliminating the gaseous reactants and their attendant apparatuses, still exposed the youngsters to those certain hazards of Justi et al. which should be avoided altogether if a totally suitable cell is to be provided.

Specifically, both Justi et al. and Adam et al. employ monohydric alcohols as fuels even though methanol, if consumed by an unknowing youngster, could cause total loss of sight, and ethanol, if similarly consumed, can cause illness and impairment of nerve centers. Both also employ alkali hydroxides as electrolytes which, if spilled, can permanently scar tissue and personal effects and, which, if consumed, are capable of destroying the vocal cords and other vital organs.

Thus, the need exists not only for a classroom fuel cell unit which is uncomplicated in its structure, but for a unit which demonstrates the desired principles of fuel cell operation with reagents which cannot permanently injure, disfigure or maim even if obtained by youngsters who employ them in a most unpredictable fashion.

The present invention is predicated upon our discovery of an effective, yet harmless, all-liquid fuel-electrolyte-oxidant system for use in low temperature catalyst activated fuel cells which, even if accidentally consumed, would cause only slight stomach gas and a mild cathartic effect but no permanent injuries. The system comprises a strategic mixture of glycerine, an aqueous nontoxic electrolyte, hydrogen peroxide and water, as shall hereinafter be described in detail.

Accordingly, a prime object of the present invention is to provide an improved fuel cell of the type described which eliminates the cumbersome apparatus and inherent toxicity of the prior art.

A further object of the present invention is to provide a fuel cell unit which is safe to use around or be used by children, clearly demonstrates fuel cell principles by a readily discernible power output, and which may easily and inexpensively be produced.

A still further object of the present invention is to provide a three component liquid system for use in fuel cells which is nontoxic, even if unwittingly spilled or consumed by youngsters using the unit with which it is employed.

Figure 1:
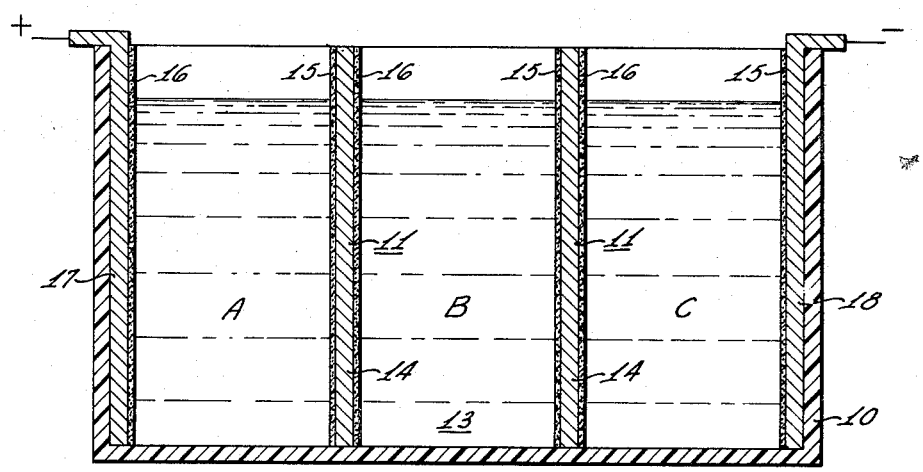

These and still further objects as shall hereinafter appear are readily fulfilled by the present invention in a remarkably unexpected fashion as shall be discerned from the following description, especially when considered in conjunction with the attached drawing in which:

FIG. 1 is a side elevation of a fuel cell of the type with which the liquid system of the present invention may be employed; and FIG. 2 is a plan view of the fuel cell of FIG. 1.

Referring to the drawing, the present invention will be illustrated in connection with a fuel cell module which comprises a liquid tight housing 10 and a plurality of plates 11 inserted into a plurality of grooves 12 and extending across the chamber 13 defined by the housing 10. The module shown comprises three cells A, B, and C connected in series.

Plate 11, as shown, is one of the novel bipolar electrodes described in the copending application of Bruce H. Fiedler, Serial No. 86,645, filed February 2, 1961. It is of course understood that other of the known electrode designs may be employed in practicing the present invention without a departure therefrom.

Plate 11, as shown, comprises a central portion 14, formed of an electrically conductive, caustic resistant, mechanically strong substrate material such as nickel, stainless steel or the like, having a first and second catalytic layer 15, 16, respectively, disposed thereupon in the manner to be explained.

One of the catalytic layers, for example layer 15, consists of a suitable glycerine activating catalyst such, for example, as those of the platinum group, that is, platinum, palladium, osmium, iridium, rhodium and ruthenium.

Catalytic layer 16 consists of a hydrogen peroxide activating catalyst such, for example, as silver, cobalt and nickel, their oxides, and mixtures of the heavy metal oxides such as iron, cobalt, nickel and silver.

Both the fuel catalyst and the oxidant catalyst may be disposed upon the central portion by electro or chemically plating, whichever is convenient, with equally desirable results. In each instance, the opposite side will be either mechanically or chemically masked.

Plate 11, thus prepared, functions both as cathode and anode, that is, it is bipolar. In addition, central portion 14 functions to electrically connect adjacent cells for series operation.

When plates 11 are arranged within housing 10 in slots 12, the layers 15 are all oriented in the same hand so as to face layers 16.

Unipolar electrodes 17, 18 are provided adjacent each end wall of housing 10 to maximize the use of chamber 13. As shown, electrode 17 is the cathode of cell A and electrode 18 is the anode of cell C.

We shall now describe the special bath of the present invention which may be employed to operate fuel cells and fuel cell modules such as those described above.

Essentially our system consists of a unitary solution of water and three active components, to wit, the fuel, the electrolyte, and the oxidant.

Glycerine has been determined to be nontoxicogenic and at the same time compatible with the other components of the system to provide a demonstrative electrical output. Glycerine is, therefore, the fuel of the system.

Hydrogen peroxide, used in the manner hereinafter described, is also nontoxicogenic and at the same time compatible with glycerine and the other components of the system to provide a demonstrative electrical output. Hydrogen peroxide is, therefore, the oxidant of the system.

The determination of electrolytes which are nontoxicogenic and at the same time compatible with glycerine and hydrogen peroxide to permit the system to react to provide a demonstrative electrical output, while avoiding ancillary reactions which provide toxic oxidation products, developed that aqueous solutions of the carbonates and bicarbonates of potassium and sodium were highly satisfactory.

A method of preparing a bath embodying the present invention shall now be described utilizing potassium carbonate as the electrolyte salt.

From about 100 to about 800 grams, and preferably from about 300 to about 700 grams, of potassium carbonate are dissolved in a liter of water to provide in aqueous solution of potassium carbonate.

To an appropriate amount of this solution, for example 50 milliliters, is added an equal volume of an aqueous hydrogen peroxide solution containing from about 0.3 to about 6.0 percent hydrogen peroxide, i.e., sufficient hydrogen peroxide to give a final bath concentration of not over about 3 percent by weight. To this mixture glycerine is added sufficient to provide from about 5 up to about 20 percent (by weight) of glycerine in the bath analysis. The resulting fuel-oxidant-electrolyte solution or bath is then poured into the module compartment and surrounds the plates immersed therein whereupon the production of electrical power commences.

Optimum electrical power in the described ranges of nontoxicogenic effect is found to result from a bath consisting of: 18.1 percent (by weight) of potassium carbonate; 71.5 percent water; 1.2 percent hydrogen peroxide; and 9.2 percent glycerine.

It has been found that these percentages can be varied over a wide range without significantly detracting from the demonstrative power output of the cell. Thus the bath can contain as low as 3 percent (by weight) and as high as 30 percent potassium carbonate and the glycerine may vary in the range of from about 5 up to about 20 percent of the total weight of the bath.

It has been observed that the dissolution of potassium carbonate in water to make up the aqueous electrolyte solution usually results in the evolution of heat. If the formulation of the mixture is completed while the heat continues to evolve so that the demonstration may be performed while the bath is still somewhat warm, even greater electrical output is achieved.

In operating the aforedescribed module, the bath is poured into chamber 13 and surrounds plates 11. Plates 11 are supported in substantially parallel relationship to each other by slots 12 which hold them relatively loosely and divide chamber 13 into three communicating sections or cells.

When the bath is thus disposed in chamber 13, the end electrodes 17, 18 are connected by an external circuit (not shown) and the glycerine and peroxide begin to react whereupon the desired electrical current begins to flow through the external circuit between electrodes 17, 18.

The reaction at the fuel electrode is believed to proceed with the electrolyte and the fuel particles, i.e., both ions and molecules, being adsorbed side by side over the entire electrode surface. Upon being adsorbed, the molecules of glycerine are split by the forces of interaction caused by the active catalytic surface. The split molecules present in the chemisorbed state at the catalyst surface (a thin plate of platinum, palladium and the like) react with the electrolyte to take up anions and give off electrons to the fuel electrode which is thereby charged negatively. Fresh fuel molecules are continuously supplied from the liquid bath by diffusion to the electrode surface. This process continuously furnishes the reaction products back into the electrolyte space.

To further aid in the understanding of the present invention, and not as a limitation of scope, the following examples are presented to illustrate several baths formulated in accordance with the present teaching and the electrical properties resulting from their use in a single cell in which the fuel electrode is formed of a nickel sheet and carries a platinum catalyst and the oxidant electrode is formed of a nickel sheet and carries a silver catalyst. The electrodes are immersed into the bath in spaced relationship to each other. Each electrode had a gross area of 3.75 square inches. The readings reported were obtained by connecting the electrodes with an external circuit with which a voltmeter is connected in parallel and an ammeter is connected in series.

*Example I*

A bath was formed by admixing a 50 percent saturated aqueous solution of potassium carbonate ($K_2CO_3$) with amounts of hydrogen peroxide and glycerine to provide a bath having an analysis, in weight percent, of: 27.6 percent $K_2CO_3$, 0.5 percent $H_2O_2$, 18.5 percent glycerine and 53.4 percent water.

The described cell unit, operated with this bath, provided the following results:

| Amps | Open circuit | 0.1 | 0.18 | 0.32 | 0.36 | 0.39 |
|---|---|---|---|---|---|---|
| Volts | 0.64 | 0.50 | 0.40 | 0.30 | 0.20 | 0.10 |

*Example II*

A bath was formed, as in Example I, having an analysis, in weight percent, of: 28.4 percent $K_2CO_3$, 0.2 percent $H_2O_2$, 9.4 percent glycerine, and 62.0 percent water.

The described cell unit, operated with this bath, provided the following results:

| Amps | Open circuit | 0.056 | 0.15 | 0.45 | 0.64 | 0.72 |
|---|---|---|---|---|---|---|
| Volts | 0.55 | 0.45 | 0.40 | 0.30 | 0.20 | 0.12 |

*Example III*

A bath was formed, as in Example I, having an analysis, in weight percent, of: 26.6 percent $K_2CO_3$, 0.1 percent $H_2O_2$, 18.7 percent glycerine, and 54.6 percent water.

The described cell unit, operated with this bath, provided the following results:

| Amps | Open circuit | 0.10 | 0.18 | 0.32 | 0.36 | 0.39 |
|---|---|---|---|---|---|---|
| Volts | 0.64 | 0.50 | 0.40 | 0.30 | 0.20 | 0.10 |

*Example IV*

A bath was formed by admixing an aqueous solution of potassium bicarbonate ($KHCO_3$) with amounts of hydrogen peroxide and glycerine to provide a bath having an analysis, in weight percent, of: 15.9 percent $KHCO_3$, 1.2 percent $H_2O_2$, 11.9 percent glycerine, and 71.0 percent water.

The described cell unit, operated with this bath, provided the following results:

| Amps | Open circuit | 0.024 | 0.04 | 0.055 | 0.085 | 0.135 |
|---|---|---|---|---|---|---|
| Volts | 0.19 | 0.19 | 0.17 | 0.16 | 0.14 | 0.12 |

*Example V*

A bath was formed, as in Example III, having an analysis, by weight percent, of: 29.9 percent $K_2CO_3$, 0.1 percent $H_2O_2$, 8.9 percent glycerine and 61.1 percent water.

The described cell unit, operated with this bath, provided the following results:

| Amps | Open circuit | 0.05 | 0.13 | 0.29 | 0.37 | 0.42 |
|---|---|---|---|---|---|---|
| Volts | 0.52 | 0.45 | 0.40 | 0.30 | 0.20 | 0.15 |

*Example VI*

A bath was formed, as in Example V, having an analysis, in weight percent, of: 28.2 $K_2CO_3$, 0.6 $H_2O_2$, 9.4 percent glycerine, and 61.8 percent water.

The described cell unit, operated with this bath, provided the following results:

| Amps | Open circuit | 0.02 | 0.045 | 0.27 | 0.55 | 0.75 |
|---|---|---|---|---|---|---|
| Volts | 0.34 | 0.30 | 0.28 | 0.25 | 0.20 | 0.13 |

Thus, a fuel cell system has been described which obviates the disadvantages attendant the prior art cells and fulfills all of the aforestated objectives to a remarkably unexpected extent.

It is of course understood that the specific embodiments herein described and illustrated are presented for illustrative purposes only and that such changes and modifications as will occur to the artisan are intended within the spirit of this invention especially as it is defined by the appended claims.

Having now particularly described and ascertained the nature of our said invention and the manner in which it is to be performed, we declare that what we claim is:

1. The process for the direct production of electrical energy from the oxidation of a fuel and the reduction of an oxidant in a fuel cell of the type having a fuel electrode and an oxidant electrode which are mounted in spaced apart relation to each other within a housing comprising applying a catalyst selected from the group consisting of platinum, palladium, iridium, rhodium, osmium and ruthenium to said fuel electrode; applying a catalyst selected from the group consisting of silver, cobalt, nickel and the oxides of silver, cobalt, nickel and iron to said oxidant electrode; mounting said fuel and oxidant electrodes within said housing in spaced apart relation to each other; and at least partially immersing the oxidant and fuel electrodes into a nontoxic unitary fuel-oxidant-electrolyte solution comprising by weight from 5 to about 20 percent glycerine, from about 0.1 to about 3 percent hydrogen peroxide, from about 3 to about 30 percent of a dissolved salt selected from the group consisting of the carbonates and bicarbonates of sodium and potassium, and the remainder being essentially water.

2. The process for the direct production of electrical energy from the oxidation of a fuel and the reduction of an oxidant in which a fuel electrode carrying a catalyst selected from the group consisting of platinum, palladium, iridium, rhodium, osmium and ruthenium and an oxidant electrode carrying a catalyst selected from the group consisting of silver, cobalt, nickel and the oxides of cobalt, iron, silver and nickel are maintained in spaced apart relation to each other, and the improvement comprising at least partially immersing the oxidant electrode and the fuel electrode into a nontoxic unitary fuel-oxidant-electrolyte solution comprising glycerine, hydrogen peroxide, water and a dissolved salt selected from the group consisting of the carbonates and bicarbonates of sodium and potassium.

3. The process according to claim 1 in which said unitary fuel-oxidant-electrolyte solution when prepared comprises by weight from about 5 to about 20 percent glycerine, from about 0.1 to about 3 percent hydrogen peroxide, from about 3 to about 30 percent of said salt and the remainder being essentially water.

4. The process according to claim 2 in which said fuel electrode carries a platinum catalyst and said oxidant electrode carries a silver catalyst.

5. The process of producing electrical power from series connected fuel cells having a unipolar oxidant electrode, a unipolar fuel electrode, a bipolar electrode having a fuel electrode and an oxidant electrode on opposite sides thereof between the unipolar oxidant electrode and the unipolar fuel electrode in spaced apart relation; a catalyst selected from the group consisting of silver, nickel, cobalt, and the oxides of nickel, silver, cobalt and iron on said oxidant electrodes; a catalyst selected from the group consisting of platinum, palladium, ruthenium, osmium, iridium and rhodium, on said fuel electrodes; and the improvement comprising at least partially immersing said electrodes into a nontoxic unitary fuel-oxidant-electrolyte solution comprising by weight from about 5 to about 20 percent glycerine, from about 0.1 to about 3 percent hydrogen peroxide, from about 3 to about 30 percent of a dissolved salt selected from the group consisting of the carbonates and bicarbonates of sodium and potassium and the remainder being essentially water.

6. In a fuel cell having a housing, a platinum catalyzed fuel electrode and a silver catalyzed oxidant electrode mounted in said housing in spaced relation to each other; the improvement comprising having each electrode at least partially immersed in a nontoxic unitary fuel-oxidant-electrolyte solution which comprises by weight from about 5 to about 20 percent glycerine, from about 0.1 to about 3 percent hydrogen peroxide, from about 3 to about 30 percent of a dissolved salt selected from the group consisting of the carbonates and bicarbonates of sodium and potassium, and the remainder being essentially water.

7. A fuel cell for the direct production of electrical energy comprising a housing having a chamber; a nontoxic unitary fuel-oxidant-electrolyte solution disposed in the chamber, said solution comprising by weight from about 5 to about 20 percent glycerine, from about 0.1 to about 3 percent hydrogen peroxide, from about 3 to about 30 percent of a dissolved salt selected from the group consisting of the carbonates and bicarbonates of sodium and potassium, and the remainder being essentially water; a unipolar oxidant electrode, a unipolar fuel electrode, a bipolar electrode having a fuel electrode and an oxidant electrode on opposite sides thereof between the unipolar oxidant electrode and the unipolar fuel electrode in spaced apart relation within said housing and at least partially immersed in said solution to divide the chamber into series connected cells; a catalyst selected from the group consisting of platinum, palladium, iridium, osmium, rhodium and ruthenium on said fuel electrodes; and a catalyst selected from the group consisting of silver, nickel, cobalt and the oxides of iron, silver, nickel and cobalt on said oxidant electrodes.

References Cited by the Examiner

UNITED STATES PATENTS

| | | | |
|---|---|---|---|
| 1,403,462 | 1/22 | Williams. | |
| 2,901,523 | 8/59 | Justi et al. | 136—86 |
| 2,901,524 | 8/59 | Gorin et al. | 136—86 |
| 2,969,315 | 1/61 | Bacon | 136—86 |

OTHER REFERENCES

"How to Make a Demonstration Fuel Cell," Brochure of Esso Research and Engineering Co., P.O. Box 45, Linden, New Jersey, March 1961.

JOHN H. MACK, *Primary Examiner.*

JOHN R. SPECK, *Examiner.*